Patented Oct. 4, 1949

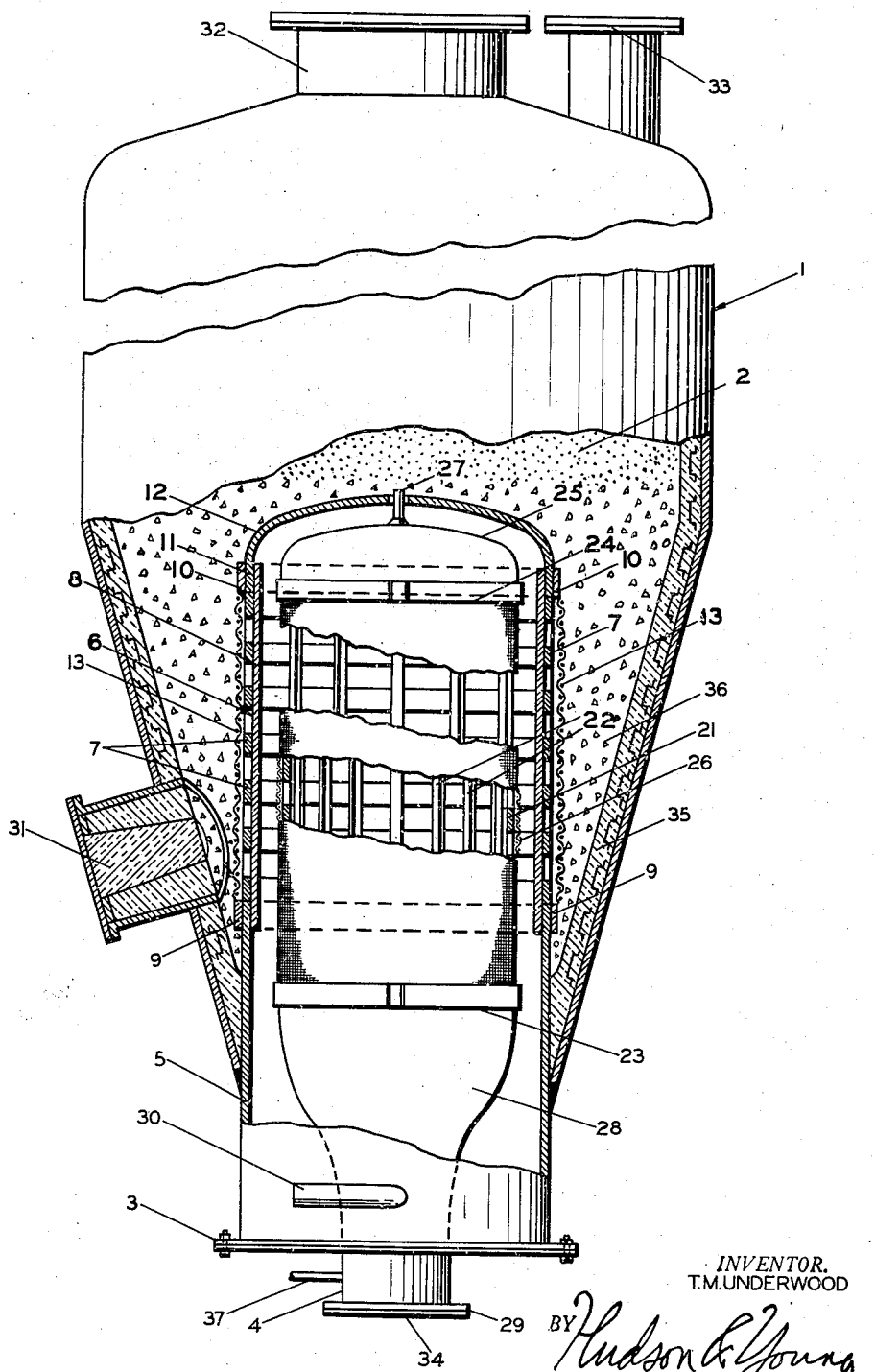

2,483,948

UNITED STATES PATENT OFFICE 2,483,948

TREATING TOWER CONTAINING SOLID CONTACT MATERIAL

Thomas M. Underwood, Bartlesville, Okla., assignor to Phillips Petroleum Company, a corporation of Delaware Application March 4, 1946, Serial No. 651,964

4 Claims. (Cl. 23—288)

This invention relates to chemical treating towers. In one of its more specific aspects it relates to chemical treating towers adapted to the treating of hydrocarbon fluids with solid contacting material.

The apparatus of my invention finds utility as a catalyst chamber in hydrocarbon conversion reactions, in clay treating of hydrocarbons and in other applications wherein a fluid is contacted with a solid reagent.

An object of my invention is to provide a treating tower adapted for contacting a downflowing fluid with a stationary bed of solid reagent.

Another object of my invention is to provide a treating tower for contacting downflowing fluids with a stationary bed of solid reagent wherein the downflowing fluids exit from the treating tower free from solid reagent.

Still another object of my invention is to provide a treating tower for contacting downflowing fluids with a stationary bed of solid reagent material wherein the downflowing fluid is freed from solid reagent material by a removable separating device and wherein said separating device may be removed from the tower or repaired without removal of the solid reagent material from within the tower.

Still other objects and advantages of my invention will be apparent to those skilled in the art from a careful study of the following description and the attached drawing which respectively describes and illustrates a preferred form of my apparatus.

The figure illustrates an elevation, partly in section, showing a preferred embodiment of my invention.

Referring now to the figure, a vessel 1 adapted to be filled with a solid contacting material 2 of substantially any desired size or mixture of sizes. The lower portion of the vessel is conical in shape decreasing in diameter from that of the main portion of the vessel to a diameter as dictated by the size of a member to be inserted into the small end of the cone. This small end of the cone is closed by a cylindrical member 5 the lower end of which is closed by a flange member 3 containing a tube member 4. The line of contact of the conical member and the cylindrical member 5 may be a welded joint or any other type of joint provided the connection be rigid and strong and adaptable to withstand such temperatures and temperature changes as may occur during operations. The cylindrical member 5 extends some short distance up into the vessel as illustrated. Beyond the upper end of the solid shell of this cylindrical member 5 is a cylindrical lattice member 6 which is composed of circular rings 7 and vertical slats or stays 8. These rings and slats may be welded together in order to provide a rigid cylindrical member. As illustrated the rings 7 are of the same diameter as the cylindrical member 5 while the slats 8 are fixed to the inside of the circular rings 7.

At the upper end of the cylindrical member 5 is fixed a circular band member 9. This band as shown in the drawing is attached to the outer circumference of the member 5. At the top of the cylindrical lattice member 6 is a second circular band member 10. The space between the circular member 10 and the slats 8 is provided for receiving a skirt portion 11 of a dome cover 12. For rigidity purposes I prefer that the dome cover member 12 be a solid member and welded to the band member 10 or slats 8 or to both.

Outside of the cylinder made by the circular rings 7 is a heavy screen member 13 which fits tightly around the rings 7 and above the circular band member 9 and below the corresponding band member 10.

Inside this above described outer screen assembly is an inner screen assembly. The general construction of the latter assembly is very similar to the former and consists of a plurality of circular rings 21 held in spaced relation to one another by a plurality of vertically disposed slats 22. This assembly has an outer lower ring 23 and an outer upper ring 24 similar to rings 9 and 10, respectively. A dome shaped cap 25 sits on top of this inner assembly while a fine mesh screen 26 forms a cylinder just outside and adjacent the circular rings 21.

A dowel pin arrangement 27 serves to hold the top portions of these two assemblies in spaced relation to each other.

The lower part of the inner assembly is attached rigidly to the large diameter end of a hollow swedge shaped member 28. This member is simply a diameter reducing element and a support for the inner screen assembly. The small diameter end of the swedge member passes through the flange 3 and itself is flanged 29 for connection to a pipe, not shown, for transfer of inlet or outfield fluid.

A pipe 30 may be installed as shown for fluid communication from an exterior source, not shown, to the annular space between the inner screen-swedge assembly and the outer screen assembly.

One or more taper-plug outlets 31 are shown at a point near the bottom of the solid reagent containing portion of the vessel through which outlets reagent may be taken when it is necessary to recharge the vessel.

An upper opening 32 is provided for charging the chamber with solid reactant or catalyst material. Connection 33 is provided as a reactant fluid inlet or outlet, while the connection 34 serves as inlet or outlet for the opposite end of the vessel.

In case the vessel need be lined for specific uses, a lining 35 of any desired kind or type may be provided.

When using the above-described chamber for a downflow fluid-solid contacting reaction, fluid enters the unit through the upper inlet connection 33 and passes downward through the bed 2 of solid contacting material. Under this solid contacting material 2 may be some coarser aggregate material 36. This material is packed between the conical wall of the vessel and the outer screen member 13. By this means the major portion of any finely divided solid reagent material will be retained within the coarse aggregate. A further proportion will be retained along with the coarse aggregate on the outside of the screen 13. Some fine material will in all probability find its way through the coarse screen but since the fine mesh screen 26 will be sufficiently fine, it will obstruct the passage of said solid reagent.

I have found that by using the apparatus as herein described, that same may be used for relatively long periods of time before the fine mesh screen must be cleaned or freed from accumulated material. When, however, the fine screen must be cleaned, it is merely necessary to unbolt the lower flange 3 and drop this lower flange and inner swedge-screen assembly. In this manner this fine mesh screen may be removed for cleaning or repairing as needed.

My apparatus herein described may be used as a catalyst chamber in hydrocarbon conversion reactions. When so used the reactant fluid passes downward in contact with catalyst which is filtered from the outgoing gases in the conical portion of the chamber. After reaction has continued for such a time that combustion regeneration is necessary, it is merely necessary to shut off the flow of reactants, purge with steam or other hot inert gas as desired, then pass in regeneration gas. For this latter operation, I prefer to regenerate by addition of the oxygen containing gas through the bottom opening 4 and removing combusion products through the upper opening 33. In this manner the fine screen-coarse screen members in the lower portion of my apparatus are not exposed to combustion temperatures. Hence such screens have been found to last for relatively long periods of time.

My apparatus may be used in vapor or liquid phase clay treating operations. For such use the chamber may be fitted with the active clay to be used and the vapor or liquid passed downward. Treated material substantially free from solid matter issues through bottom outlet 4 and is passed to such subsequent processing steps as desired. For clay treating purposes the "aggregate" or coarse material 36 portion of the vessel may be charged with any desired material provided it is suitable and serves the purpose at hand. The inlet pipe 30 is provided for introducing a liquid, such as liquid polymer formed in the clay treating operation. Steam may be added with the polymer in this inlet pipe 30, or may be added through a small steam line 37 directly into the outlet 4 for surging momentarily in a reverse direction to that of normal flow. In this manner chemical deposits may be removed from the outer surface of the fine screen 26 and the screen thus kept open to the passage of vapors and gases for long periods of time, or for such periods as are required in such processes as practiced in the apparatus of my invention.

As mentioned hereinbefore when necessary to regenerate a catalyst by combustion, I prefer to pass the oxygen containing gases upward so as to protect the screen cages from combustion temperature.

The catalyst may be changed or replaced easily since I have provided one or more wedge cleanouts. Any type of liner for the vessel may be used, preferably the liner selected should be selected in consideration of the process to be practiced and the temperatures to be encountered.

Substantially any materials of construction may be used, they should, however, be suitable from the point of view of corrosion, temperature resistance, and other considerations understood by those skilled in such art.

It will be obvious to those skilled in the art that many variations and modifications of the apparatus of my invention may be made without departing from the intended spirit and scope of my invention.

Having disclosed my invention, I claim:

1. A treating tower comprising a substantially vertically disposed, elongated, closed outer vessel; a conduit in the top closure of said vessel; a first inner vessel extending a spaced distance upwardly into the bottom end of said outer vessel and being sealed therein in such manner as to be spaced from the walls of said outer vessel, said first inner vessel being closed at its upper end, being coarsely perforate in that portion of its side walls within said outer vessel and closed at its lower end by a removable closure; and a second inner vessel extending upwardly through said removable closure member a spaced distance into said first inner vessel and being sealed by a fluid tight seal in said removable bottom closure so as to be spaced from the walls of said first inner vessel, said second inner vessel being closed at its upper end, being finely perforate in at least a portion of its side walls within said first inner vessel, and having an opening in its lower end.

2. A treating tower comprising a substantially vertically disposed closed outer cylindrical vessel the lower portion of which is conical in shape; a conduit in the top closure of said outer vessel; a first inner vessel concentrically extending a spaced distance upwardly through the conical lower portion of and into said outer vessel and being sealed therein in such manner as to be spaced from the walls of said outer vessel, said first inner cylindrical vessel being closed at its ends and being coarsely perforate in a portion of its side walls within said outer vessel; and a second inner cylindrical vessel concentrically extending upwardly a spaced distance into said first inner vessel and being sealed by a fluid tight seal in the bottom closure of said first inner vessel so as to be spaced from the walls of said first inner vessel, said second inner vessel being closed at its upper end, being finely perforate in at least a portion of its side walls within said first inner vessel, and having an opening in its lower end.

3. The treating tower of claim 2, wherein said second inner vessel together with said bottom closure of said first inner vessel is removable from said first inner vessel.

4. The treating tower of claim 2, wherein said conical lower portion of said outer vessel is provided with at least one contact material removal opening near its lower end.

THOMAS M. UNDERWOOD.

REFERENCES CITED

The following references are of record in the file of this patent:

UNITED STATES PATENTS

| Number | Name | Date |
|---|---|---|
| 2,252,719 | McCausland | Aug. 19, 1941 |